United States Patent
Tan et al.

(10) Patent No.: US 7,869,153 B1
(45) Date of Patent: Jan. 11, 2011

(54) SELF SERVO WRITE TUNE FEATURE FOR PREAMPS

(75) Inventors: Kien Beng Tan, Singapore (SG); Parviz Rahgozar, Cupertino, CA (US)

(73) Assignee: Marvell International Ltd., Hamilton (BM)

( * ) Notice: Subject to any disclaimer, the term of this patent is extended or adjusted under 35 U.S.C. 154(b) by 237 days.

(21) Appl. No.: 12/270,982

(22) Filed: Nov. 14, 2008

Related U.S. Application Data

(60) Provisional application No. 60/988,556, filed on Nov. 16, 2007.

(51) Int. Cl.
  *G11B 5/02* (2006.01)
(52) U.S. Cl. .................. 360/67; 360/75; 369/47.16; 365/189.05
(58) Field of Classification Search .................. None
  See application file for complete search history.

(56) References Cited

U.S. PATENT DOCUMENTS

| | | | | |
|---|---|---|---|---|
| 4,277,807 A | * | 7/1981 | Baldwin | 360/32 |
| 4,631,697 A | * | 12/1986 | Ferguson | 360/5 |
| 5,129,078 A | * | 7/1992 | Groves et al. | 710/36 |
| 5,206,943 A | * | 4/1993 | Callison et al. | 711/114 |
| 7,256,957 B1 | | 8/2007 | Rahgozar | |
| 2007/0090347 A1 | * | 4/2007 | Park et al. | 257/40 |

OTHER PUBLICATIONS

U.S. Appl. No. 11/355,459, filed Feb. 15, 2006; "Circuits, Architectures, Apparatuses, Systems, and Methods for Maintaining Constant Spacing in a Read/Write Apparatus for Data Storage"; Rahgozar, et al.; 55 pages.

\* cited by examiner

*Primary Examiner*—Jason C Olson

(57) ABSTRACT

A system includes N channels and a control module. Each of the N channels includes a latch and a signal generator module, where N is an integer greater than 1. The latch selectively latches a B-bit codeword, where B is an integer greater than 1. The signal generator module generates a signal based on the B bit codeword. The control module transmits the B-bit codeword via a B-bit data bus to the latch of each of the N channels. The control module generates control signals that select the latch in at least one of the N channels.

20 Claims, 11 Drawing Sheets

SELF SERVO WRITE TUNE FEATURE FOR PREAMPS

CROSS-REFERENCE TO RELATED APPLICATIONS

This application claims the benefit of U.S. Provisional Application No. 60/988,556, filed on Nov. 16, 2007. The disclosure of the above application is incorporated herein by reference in its entirety.

FIELD

The present disclosure relates to hard disk drives (HDDs), and more particularly to self-servo-write (SSW) systems of HDDs.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

Referring now to FIG. 1, a hard disk drive (HDD) 10 includes a hard disk assembly (HDA) 12 and a HDD printed circuit board (PCB) 14. The HDA 12 includes one or more circular platters 16, which have magnetic surfaces that are used to store data magnetically. Data is stored in binary form as a magnetic field of either positive or negative polarity. The platters 16 are arranged in a stack, and the stack is rotated by a spindle motor 18. At least one read/write head (hereinafter, "head") 20 reads data from and writes data on the magnetic surfaces of the platters 16.

Each head 20 includes a write element, such as an inductor, that generates a magnetic field and a read element, such as a magneto-resistive (MR) element, that senses the magnetic field on the platter 16. The head 20 is mounted at a distal end of an actuator arm 22. An actuator, such as a voice coil motor (VCM) 24, moves the actuator arm 22 relative to the platters 16.

The HDA 12 includes a preamplifier device 26 that amplifies signals received from and sent to the head 20. When writing data, the preamplifier device 26 generates a write current that flows through the write element of the head 20. The write current is switched to produce a positive or negative magnetic field on the magnetic surfaces of the platters 16. When reading data, the magnetic fields stored on the magnetic surfaces of the platters 16 induce low-level analog signals in the read element of the head 20. The preamplifier device 26 amplifies the low-level analog signals and outputs amplified analog signals to a read/write (RAN) channel (hereinafter, "read-channel") module 28.

The HDD PCB 14 includes the read-channel module 28, a hard disk controller (HDC) module 30, a processor 32, a spindle/VCM driver module 34, volatile memory 36, non-volatile memory 38, and an input/output (I/O) interface 40. During write operations, the read-channel module 28 may encode the data to increase reliability by using error-correcting codes (ECC) such as run length limited (RLL) code, Reed-Solomon code, etc. The read-channel module 28 then transmits the encoded data to the preamplifier device 26. During read operations, the read-channel module 28 receives analog signals from the preamplifier device 26. The read-channel module 28 converts the analog signals into digital signals, which are decoded to recover the original data.

The HDC module 30 controls operation of the HDD 10. For example, the HDC module 30 generates commands that control the speed of the spindle motor 18 and the movement of the actuator arm 22. The spindle/VCM driver module 34 implements the commands and generates control signals that control the speed of the spindle motor 18 and the positioning of the actuator arm 22. Additionally, the HDC module 30 communicates with an external device (not shown), such as a host adapter within a host device, via the I/O interface 40. The HDC module 30 may receive data to be stored from the external device, and may transmit retrieved data to the external device.

The processor 32 processes data, including encoding, decoding, filtering, and/or formatting. Additionally, the processor 32 processes servo or positioning information to position the heads 20 over the platters 16 during read/write operations. Servo, which is stored on the platters 16, ensures that data is written to and read from correct locations on the platters 16. In some implementations, a self-servo write (SSW) module 42 may write servo on the platters 16 using the heads 20 prior to storing data on the HDD 10. The SSW module 42 may write servo in a servo bank write mode (SBWM), where servo is written on more than one of the platters 16 at a time.

SUMMARY

A system comprises N channels and a control module. Each of the N channels comprises a latch and a signal generator module, where N is an integer greater than 1. The latch selectively latches a B-bit codeword, where B is an integer greater than 1. The signal generator module generates a signal based on the B bit codeword. The control module transmits the B-bit codeword via a B-bit data bus to the latch of each of the N channels. The control module generates control signals that select the latch in at least one of the N channels. Each of the N channels further comprises a driver that drives a load according to the signal. The B-bit codeword includes parameters for controlling the signal. The parameters are generated based on the load.

A method comprises transmitting a B-bit codeword via a B-bit data bus to N channels, where B and N are integers greater than 1. The method further comprises generating control signals that select a latch in at least one of the N channels and latching the B-bit codeword in the latch. The method further comprises generating a signal based on the B bit codeword latched in the latch. The method further comprises driving a load of the at least one of the N channels according to the signal. The method further comprises transmitting parameters for controlling the signal via the B-bit codeword and generating the parameters based on the load.

Further areas of applicability of the present disclosure will become apparent from the detailed description, the claims and the drawings. It should be understood that the detailed description and specific examples are intended for purposes of illustration only and are not intended to limit the scope of the disclosure.

BRIEF DESCRIPTION OF DRAWINGS

The present disclosure will become more fully understood from the detailed description and the accompanying drawings, wherein.

DESCRIPTION

Figure 1:
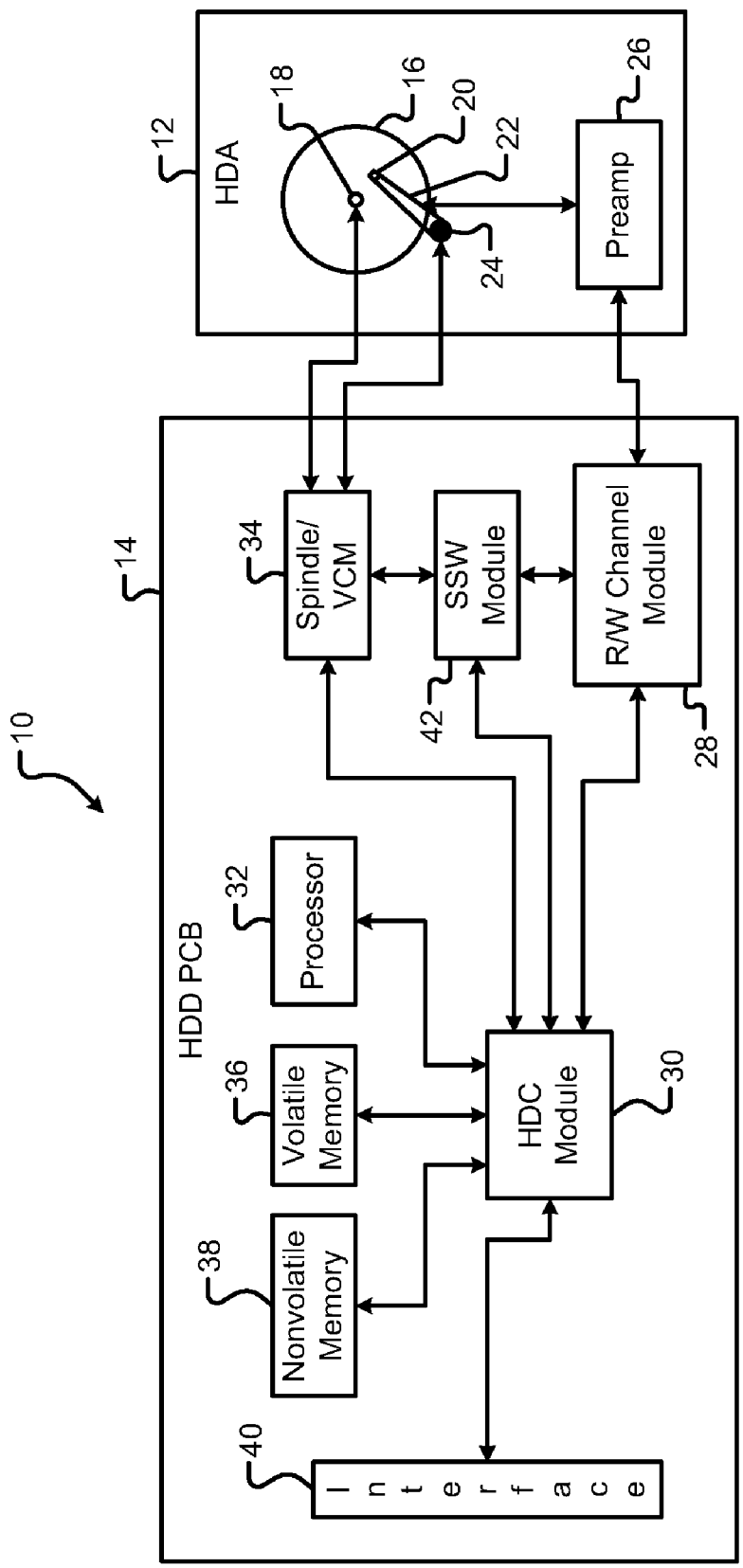
FIG. 1 is a functional block diagram of a hard disk drive (HDD)

The following description is merely exemplary in nature and is in no way intended to limit the disclosure, its application, or uses. For purposes of clarity, the same reference numbers will be used in the drawings to identify similar elements. As used herein, the phrase at least one of A, B, and C should be construed to mean a logical (A or B or C), using a non-exclusive logical or. It should be understood that steps within a method may be executed in different order without altering the principles of the present disclosure.

As used herein, the term module may refer to, be part of, or include an Application Specific Integrated Circuit (ASIC), an electronic circuit, a processor (shared, dedicated, or group) and/or memory (shared, dedicated, or group) that execute one or more software or firmware programs, a combinational logic circuit, and/or other suitable components that provide the described functionality.

Figure 2:
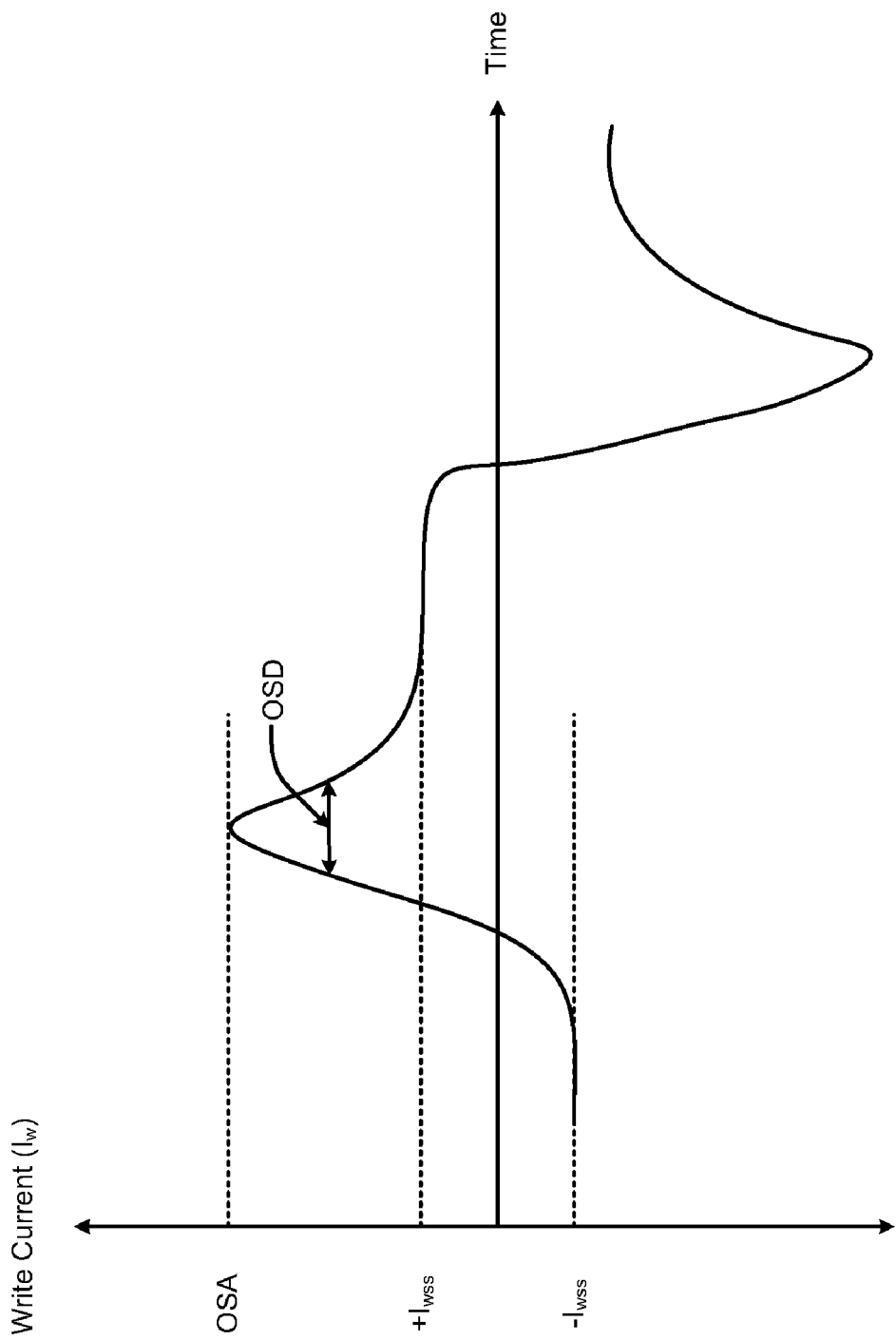
FIG. 2 depicts an exemplary write current waveform.

Referring now to FIG. 2, an exemplary waveform of write current through the heads 20 during a self-servo-write (SSW) operation is shown. Occasionally, the heads 20 may not be perfectly matched. Consequently, each of the heads 20 may write servo slightly differently. To compensate for the mismatch, magnitudes of one or more waveform parameters of the write current may be optimized for a plurality of heads. The waveform parameters may include overshoot pulse amplitude (OSA), overshoot pulse duration (OSD), and DC or steady-state value ($I_w$) of the write current. The plurality of heads may write servo uniformly when the write current is generated using the optimized waveform parameters.

The mismatch can be further compensated by individually optimizing the waveform parameters for each of the heads 20. For example, the hard disk controller (HDC) module 30 may perform a write current calibration before the SSW operation and may generate a digital codeword that controls the waveform parameters of the write current through each of the heads 20. Alternatively, the digital codewords may be generated and stored in the HDC module 30 when the hard disk drive (HDD) 10 is manufactured.

Each digital codeword may comprise bits that determine the values or magnitudes of the waveform parameters of the write current through one of the heads 20. For example only, each digital codeword may include 14 bits: 6 bits for $I_w$, 4 bits for OSA, and 4 bits for OSD. N digital codewords may determine optimum values of the waveform parameters for the write current through N heads, respectively, where N is an integer greater than 1. The mismatch between the heads 20 may be finely compensated when the waveform parameters of the write current are controlled according to the digital codeword generated for each of the heads 20.

In addition to controlling the waveform parameters of the write current, fly-height may be controlled during the SSW and normal read/write operations. Fly-height is spacing between a head and a platter when the head performs a read/write operation on the platter. Fly-height control is also called magnetic spacing modulation (MSM). A detailed discussion of fly-height measurement is included in U.S. patent application Ser. No. 11/325,760 filed on Jan. 4, 2006, which is incorporated herein by reference in its entirety. Additionally, a detailed discussion of fly-height control is included in U.S. patent application Ser. No. 11/355,459 filed on Feb. 15, 2006, which is incorporated herein by reference in its entirety.

Fly-height changes as the temperature of the heads 20 changes. When the write current flows through the heads 20, the temperature of the heads 20 increases, and the fly-height decreases due to the heat generated. When the write current stops flowing through the heads 20, the temperature of the heads 20 decreases, and the fly-height increases due to the heat dissipated.

Variations in fly-height can occur due to mismatch between the heads 20. The variations in fly-height, in turn, can cause errors during read/write operations. The variations in fly-height can be reduced and the fly-height can be maintained relatively constant by heating the heads 20 when the write current does not flow through the heads 20.

For example, the heads 20 may be heated before a write operation begins and after the write operation is completed. The heads 20 may be heated by passing a heating current through a heating element mounted on each of the heads 20. Alternatively, a heating voltage may be applied across the heating element mounted on each of the heads 20. Hereinafter, the heating current and/or the heating voltage will be collectively referred to as the heating power. For example only, the heating element may include a resistive load.

The amount of heating power that can maintain a relatively constant fly-height may differ from head to head due to mismatch between the heads 20 and due to mismatch between the heating elements of the heads 20. Additionally, the amount of heating power that can maintain a relatively constant fly-height may be different at different times depending on the timing of the read/write operations. For example, more heating power may be output to the heating element of a head when the write current increases to (or decreases from) a stead-state value than when the write current is at the steady-state value.

The amount of heating power that can maintain the fly-height relatively constant may be predetermined based on a fly-height calibration performed before the SSW operation. For example, the hard disk controller (HDC) module 30 may perform the fly-height calibration before the SSW operation and may generate a digital codeword that controls the amount of heating power to be output to each of the heads 20. Alternatively, the digital codewords may be generated and stored in the HDC module 30 when the HDD 10 is manufactured.

Each digital codeword may determine the amount of heating power to be output to the heating element of one of the heads 20. Additionally, each digital codeword may determine the time when the heating power may be output to the heating elements during the SSW and normal read/write operations. For example, N digital codewords may determine the heating power that may be output to the heating elements of N heads, respectively, where N is an integer greater than 1.

Alternatively, a single heating power may be estimated for the plurality of heads, and a single digital codeword may be output to the plurality of heads. The heating power may then be individually scaled by a scaling factor that is predetermined based on the design of each head. The fly-height can be maintained relatively constant when the heating power is generated according to the digital codeword generated for each head or when the heating power is generated according to a single digital codeword and then scaled.

Figure 3:
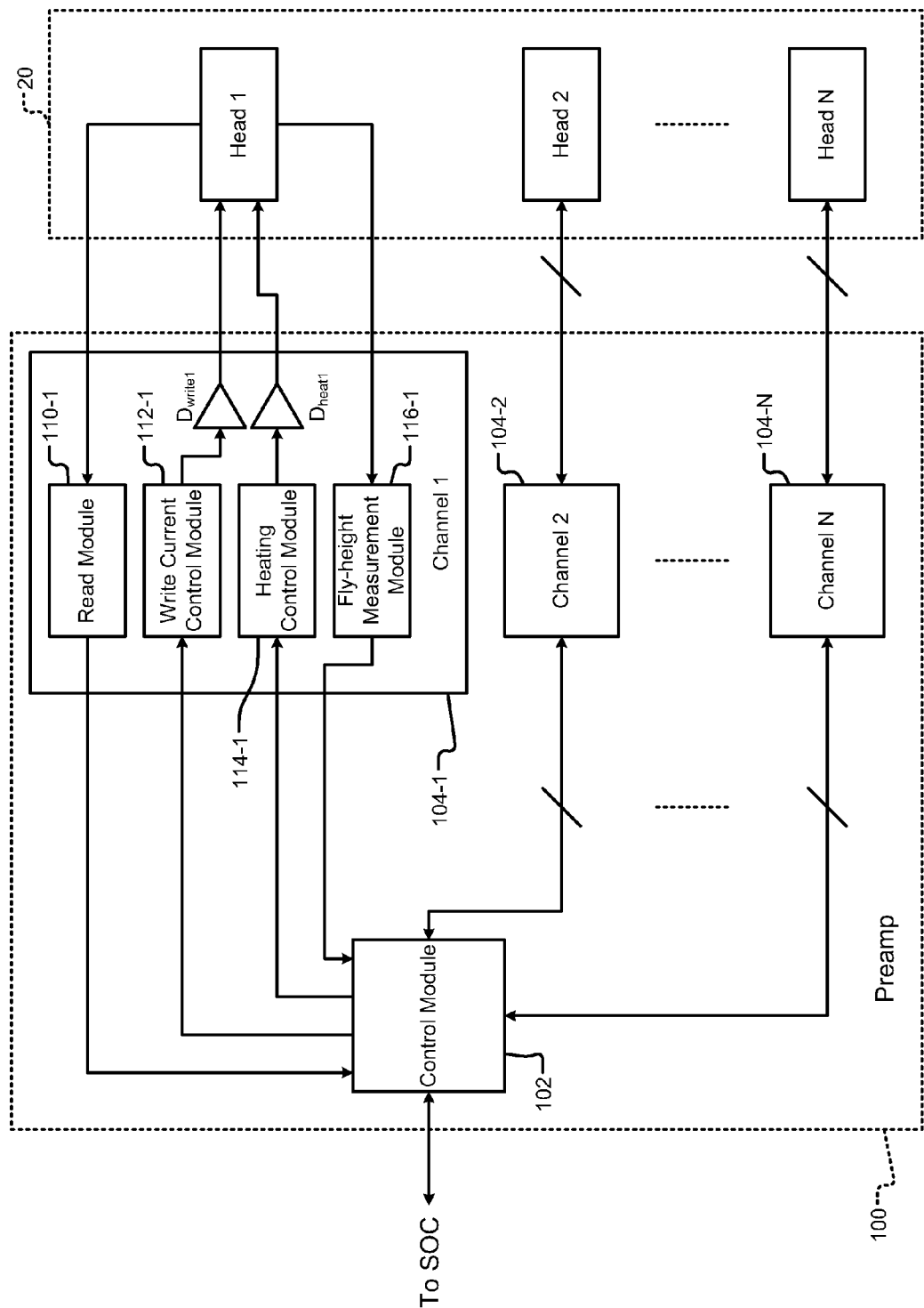
FIG. 3 is a functional block diagram of a preamp of a HDD.
Figure 4:
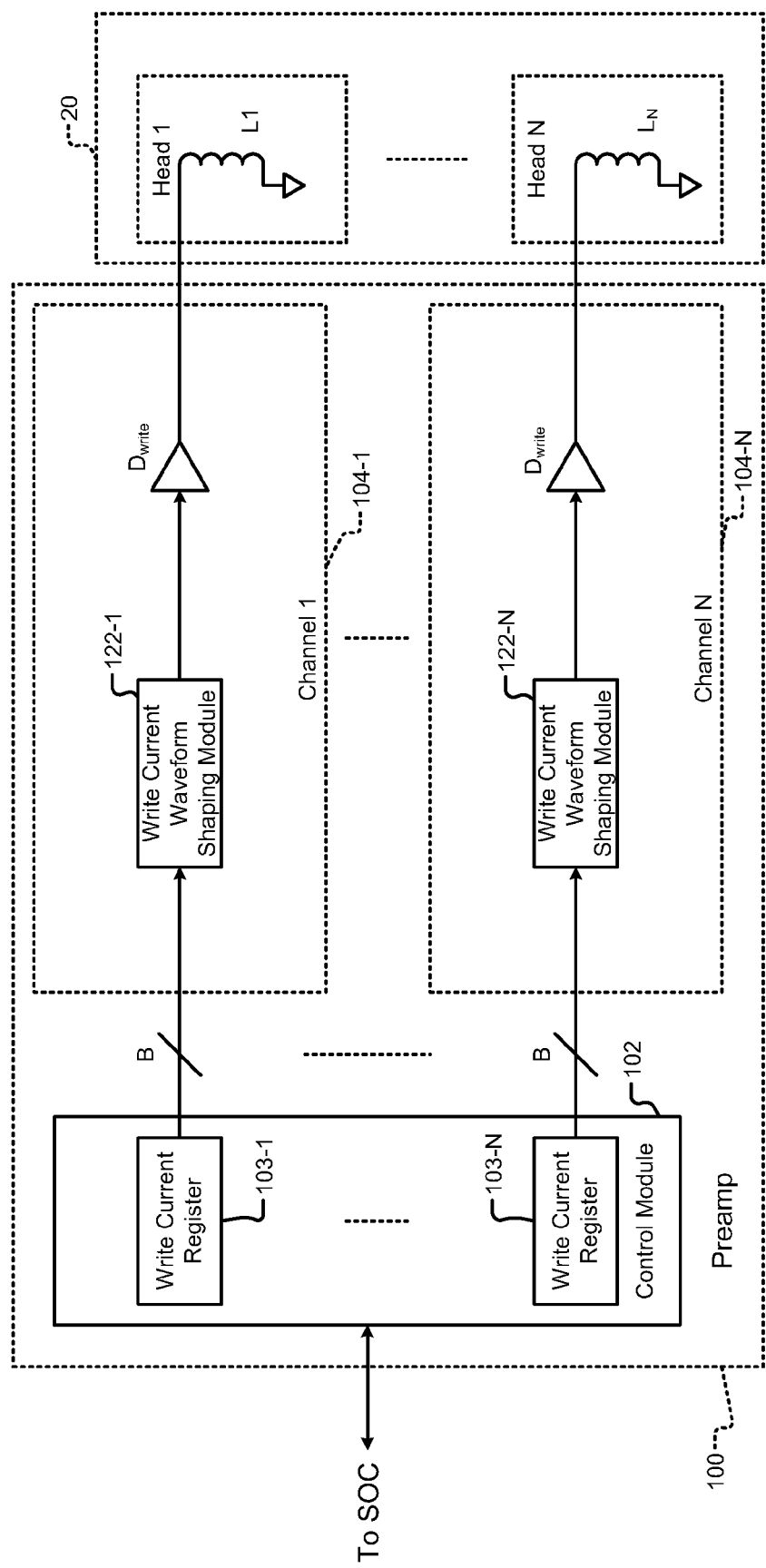
FIG. 4 is a functional block diagram of the preamp of FIG. 3 showing details of write current control.
Figure 5:
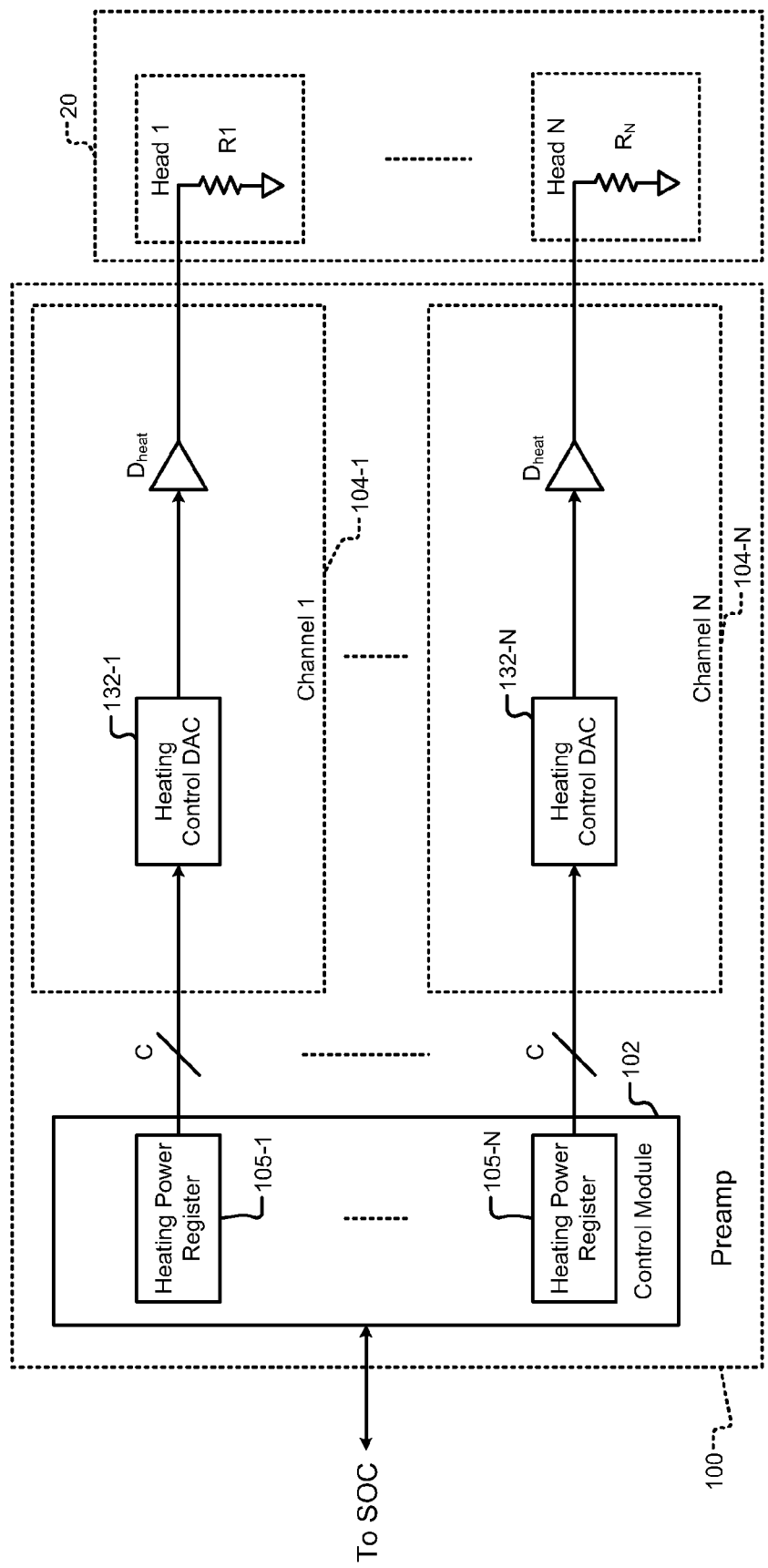
FIG. 5 is a functional block diagram of the preamp of FIG. 3 showing details of heating power control.
Figure 6A:
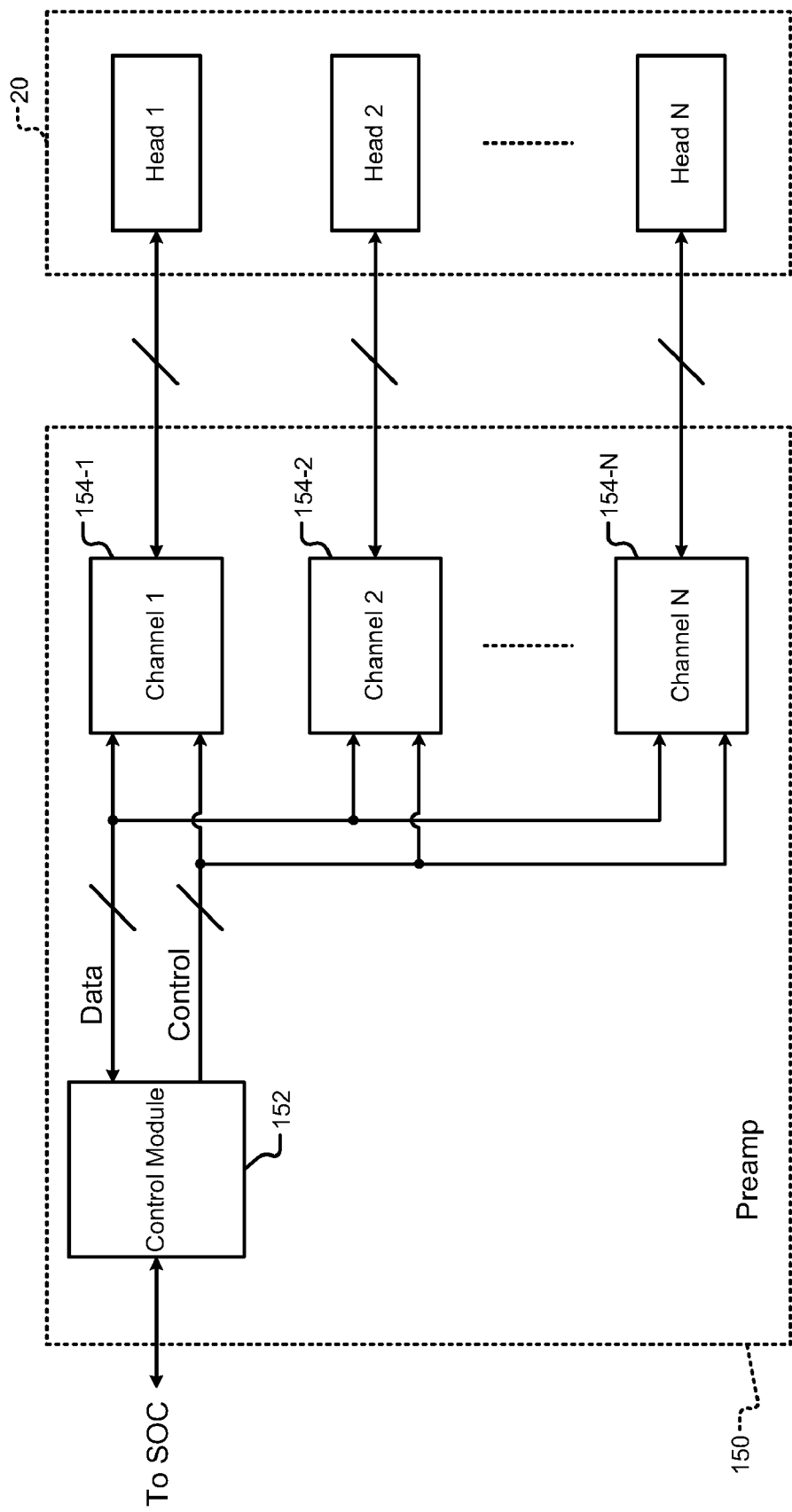
FIG. 6A is a functional block diagram of a preamp of a HDD.
Figure 6B:
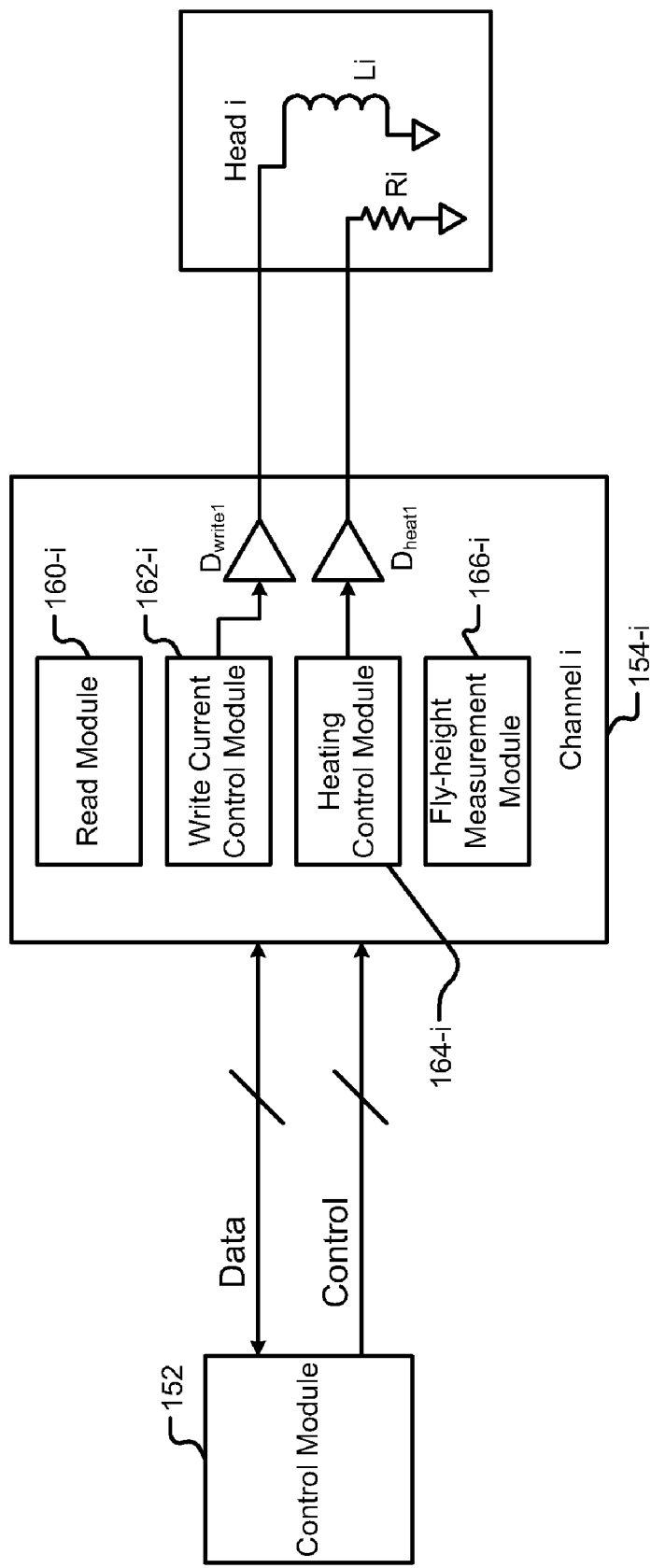
FIG. 6B is a functional block diagram of the preamp of FIG. 6A showing details of a channel of the preamp.
Figure 7:
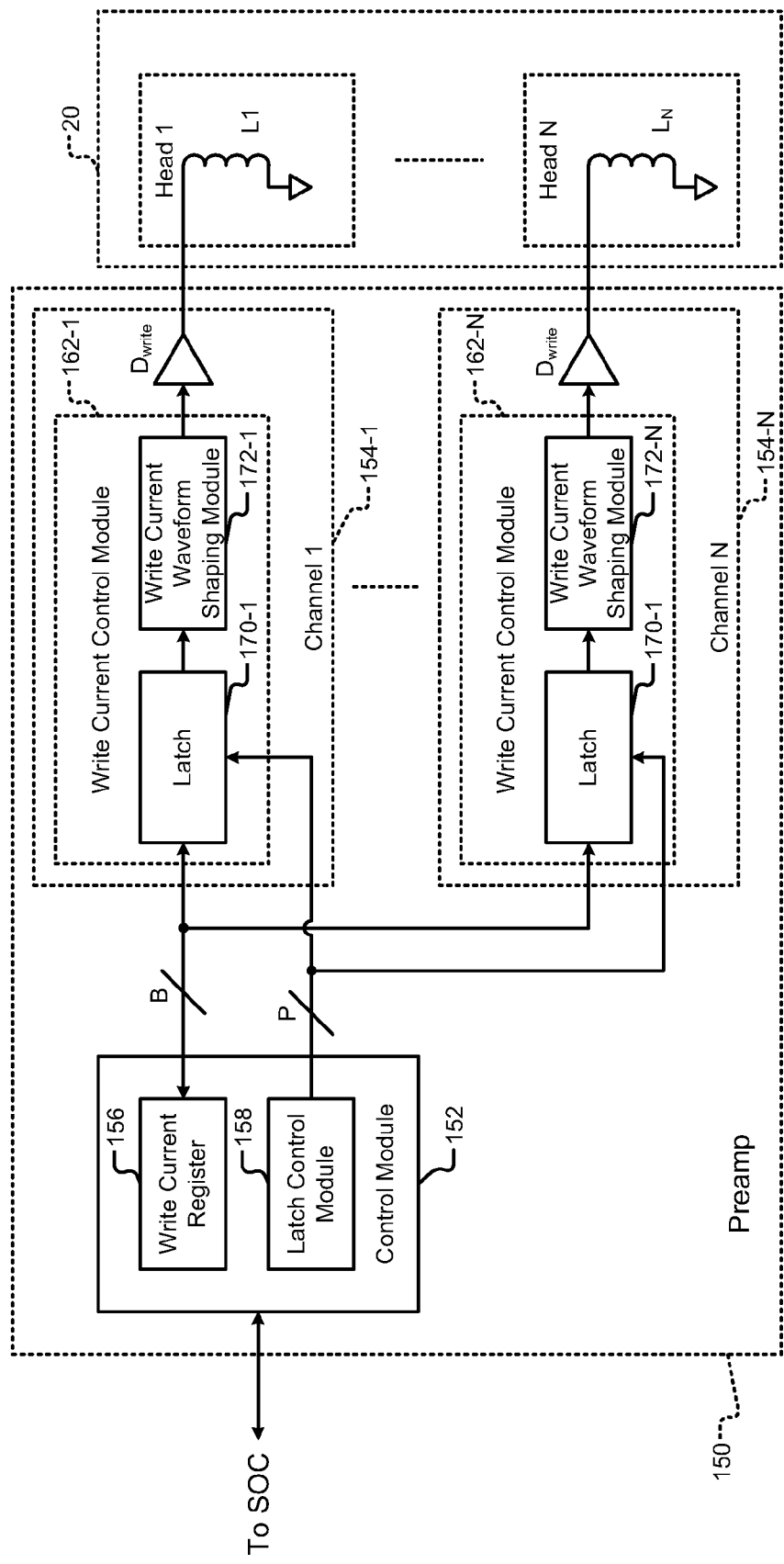
FIG. 7 is a functional block diagram of the preamp of FIG. 6A showing details of write current control.
Figure 8:
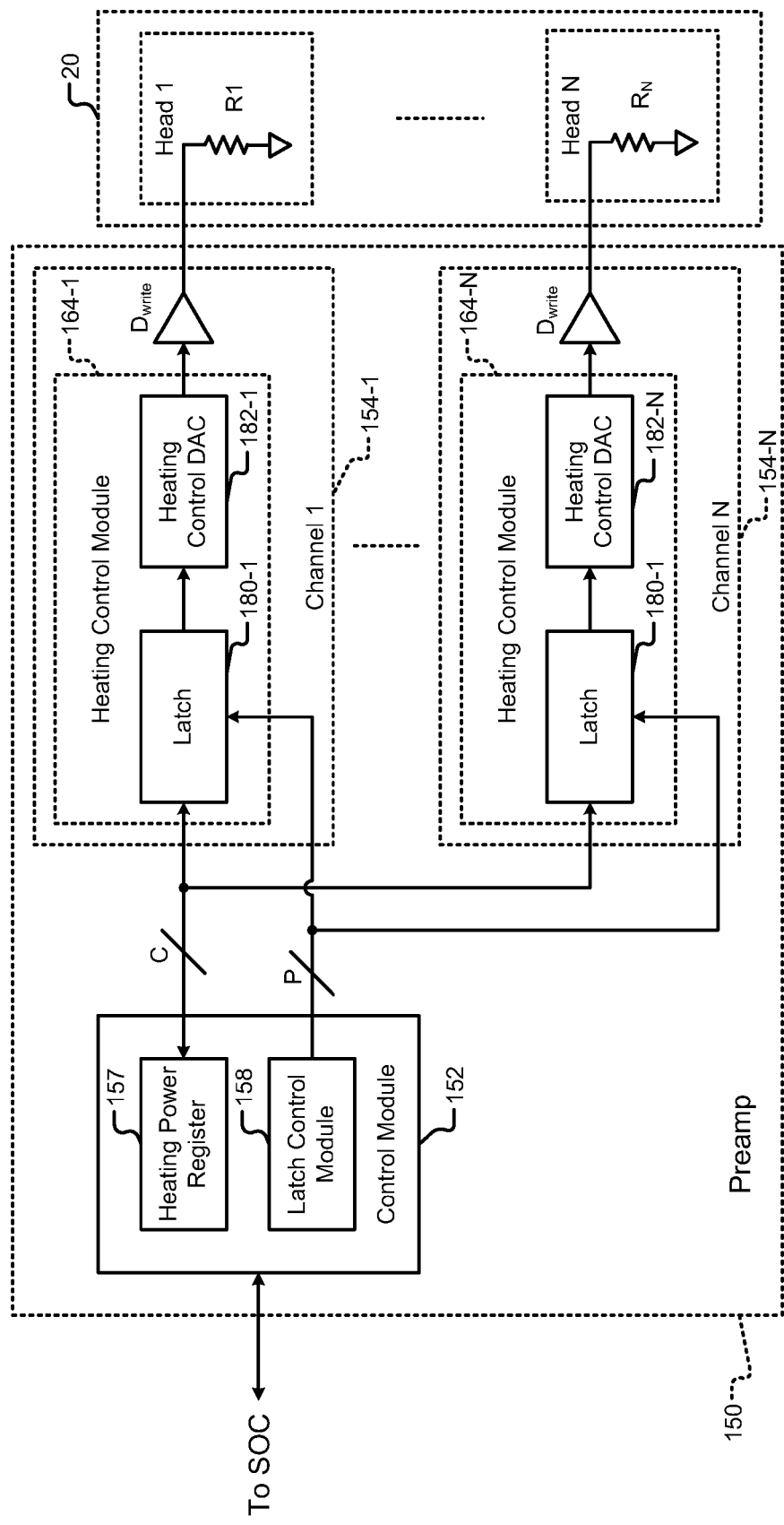
FIG. 8 is a functional block diagram of the preamp of FIG. 6A showing details of heating power control.

Before a more detailed discussion, a brief description of the drawings is presented. FIG. 3 shows a preamp that controls write current and heating power output to a plurality of heads using digital codewords common to the heads. FIG. 4 shows write current control modules of the preamp of FIG. 3 in detail. FIG. 5 shows heating control modules of the preamp of FIG. 3 in detail. FIGS. 6A and 6B show a preamp that controls write current and fly-height using separate digital codewords for each head. FIG. 7 shows the write current control portion of the preamp of FIG. 6A in detail. FIG. 8 shows the heating control portion of the preamp of FIG. 6A in detail.

Referring now to FIG. 3, a preamp 100 comprises a control module 102 and N channels that communicate with N heads, respectively, where N is an integer greater than 1. The N channels include channels 104-1, 104-2, . . . , and 104-N (collectively channels 104). The N heads include head 1, head 2, . . . , and head N. The control module 102 communicates with a system-on-chip (SOC) (not shown) that implements components of the HDD PCB 14. A channel 104-$i$ comprises a read module 110-$i$, a write current control module 112-$i$, a heating control module 114-$i$, and a fly-height measurement module 116-$i$, where is an integer, and $1 \leq i \leq N$. The write current control module 112-$i$ may comprise a write current waveform shaping module (not shown). The heating control module 114-$i$ may comprise a heating control digital-to-analog converter (DAC) (not shown). Additionally, the channel 104-$i$ comprises a write driver $D_{write}$ and a heating driver $D_{heat}$. The write driver $D_{write}$ drives a write element (not shown) of a head $i$ according to the write current received from the write current control module 112-$i$. The heating driver $D_{heat}$ drives a heating element (not shown) of the head $i$ according to the heating power received from the heating control module 114-$i$.

For example, the channel 104-1 comprises a read module 110-1, a write current control module 112-1, a heating control module 114-1, and a fly-height measurement module 116-1. The read module 110-1 receives data read by head 1 and outputs the data to the control module 102. The control module 102 forwards the data received from the read module 110-1 to the SOC. The write current control module 112-1 controls the waveform parameters of the write current through head 1 according to the digital codeword received from the control module 102. The heating control module 114-1 controls the heating power output to head 1 according to the digital codeword received from the control module 102. The fly-height measurement module 116-1 measures the fly-height of head 1 and outputs the fly-height to the control module 102. The control module 102 forwards the fly-height to the SOC. Based on the fly-height, the HDC module 30 may generate the digital codeword for heating head 1.

Referring now to FIG. 4, the control module 102 comprises N write current registers 103-1, . . . , and 103-N. The channel 104-$i$ comprises a write current waveform shaping module 122-$i$, where i is an integer, and $1 \leq i \leq N$. The write current register 103-$i$ receives the digital codeword for controlling the write current through the head i from the SOC (not shown). The control module 102 transmits the digital codeword from the write current register 103-$i$ to the write current waveform shaping module 122-$i$. The waveform shaping module 122-$i$ generates the write current according to the values of the waveform parameters in the digital codeword. The write driver $D_{write}$ of the channel 104-$i$ drives a write element $L_i$ of the head i according to the write current received from the waveform shaping module 122-$i$.

The digital codeword for controlling the write current through each head i may be B bits wide (e.g., B=14). Each write current waveform shaping module 122-$i$ receives B bits from the control module 102 via a set of B bit lines. In other words, a data bus between the control module 102 and the N channels includes N sets of B bit lines. Accordingly, a bus width of the data bus that connects the control module 102 to the N channels is (N*B).

Referring now to FIG. 5, the control module 102 comprises heating power registers 105-1, . . . , and 105-N. The channel 104-$i$ comprises a heating control DAC 132-$i$, where i is an integer, and $1 \leq i \leq N$. The heating power register 105-$i$ receives the digital codeword for controlling the heating power output to the head i from the SOC (not shown). The control module 102 transmits the digital codeword from the heating power register 105-$i$ to the heating control DAC 132-$i$. The heating control DAC 132-$i$ converts the digital codeword and generates the heating power according to the digital codeword. The heating driver $D_{heat}$ of the channel 104-$i$ drives a heating element $R_i$ of the head i according to the heating power received from the heating control DAC 132-$i$.

The digital codeword for controlling the heating power output to each head i may be C bits wide (e.g., C=7). Each heating control DAC 132-$i$ receives C bits from the control module 102 via a set of C bit lines. In other words, the data bus between the control module 102 and the N channels includes N sets of C bit lines. Accordingly, the bus width of the data bus that connects the control module 102 to the N channels is (N*C).

The bus width of the data bus that connects the control module 102 to the N channels can be reduced nearly by a factor of N by multiplexing the data bus to the N channels. For example, the digital codeword for controlling the write current through each head i may be transmitted via a single B-bit bus and latched into a latch in a corresponding channel. Additionally, the digital codeword controlling the heating power output to each head i may be transmitted via a single C-bit bus and latched into a latch in a corresponding channel.

Referring now to FIGS. 6A and 6B, a preamp 150 comprising the multiplexed data bus is shown. In FIG. 6A, the preamp 150 comprises a control module 152 and N channels that communicate with N heads, respectively, where N is an integer greater than 1. The N channels include channels 154-1, 154-2, . . . , and 154-N (collectively channels 154). The N heads include head 1, head 2, . . . , and head N. The control module 152 communicates with the SOC (not shown). A single data bus connects the control module 152 to the channels 154.

The bus width of the data bus is equal to the number of bits in the digital codeword for controlling the write current and/or the heating power for one of the N heads. The control module 152 generates control signals that select one or more channels 154. The control module 152 transmits via the data bus a digital codeword for controlling the write current and/or the heating power of one or mode heads. The control signals latch the digital codeword in a latch (not shown) of one or more channels 154 based on the control signals.

In FIG. 6B, a channel 154-$i$ comprises a read module 160-$i$, a write current control module 162-$i$, a heating control module 164-$i$, and a fly-height measurement module 166-$i$, where i is an integer, and $1 \leq i \leq N$. The read module 160-$i$ receives data read by the head i and outputs the data to the control module 152. The control module 152 forwards the data received from the read module 160-$i$ to the SOC. The write current control module 162-$i$ controls the waveform parameters of the write current through the head i according to the digital codeword received from the control module 152. The heating control module 164-$i$ controls the heating power output to the head i according to the digital codeword received from the control module 152. The fly-height measurement module 166-$i$ measures the fly-height of the head i and outputs the fly-height to the control module 152.

Additionally, the channel 154-$i$ comprises the write driver $D_{write}$ and the heating driver $D_{heat}$. The write driver $D_{write}$ drives the write element of the head i according to the write current received from the write current control module 162-$i$. The heating driver $D_{heat}$ drives the heating element of the head i according to the heating power received from the heating control module 164-$i$.

Referring now to FIG. 7, the control module 152 comprises a write current register 156 and a latch control module 158. The write current control module 162-$i$ of the channel 154-$i$ comprises a latch 170-$i$ and a write current waveform shaping module 172-$i$, where i is an integer, and $1 \leq i \leq N$. The write current register 156 receives the digital codeword for controlling the write current through each head. The write current register 156 may receive the digital codeword from the SOC (not shown). The write current register 156 and the digital codeword for controlling the write current through the head i may be B bits wide (e.g., B=14).

When the write current register 156 receives the digital codeword for controlling the write current through the head i, the latch control module 158 generates control signals that select the latch 170-$i$ of the write current control module 162-$i$ in the channel 154-$i$. The digital codeword for controlling the write current though the head i is transmitted to the latch 170-$i$ via the data bus comprising B bit lines and is latched in the latch 170-$i$ based on the control signals.

The control signals may include various signals. For example, the control signals may include head select signals. The head select signals may be different during SSW operation than during normal read/write operation. Occasionally, one or more latches 170-$i$ may be selected depending on the head select signals. Accordingly, the digital codeword in the write current register 156 may be latched in one or more latches 170-$i$ at a time.

Additionally, the latches 170-$i$ may be bidirectional. In other words, the control module 152 may read digital codewords that are latched into the latches 170-$i$. Accordingly, the control signals may include signals that indicate whether a read or a write operation is being performed relative to the latches 170-$i$.

The write current waveform shaping module 172-$i$ generates the write current according to the values of the waveform parameters in the digital codeword latched in the latch 170-$i$. The write driver $D_{write}$ of the channel 154-$i$ drives the write element $L_i$ of the head i according to the write current received from the write current waveform shaping module 172-$i$.

Referring now to FIG. 8, the control module 152 further comprises a heating power register 157. The heating control module 164-$i$ of the channel 154-$i$ comprises a latch 180-$i$ and a heating control DAC 182-$i$, where i is an integer, and $1 \leq i \leq N$. The heating power register 157 receives the digital codeword for controlling the heating power output to the heating element of each head. The heating power register 157 may receive the digital codeword for controlling the heating power output to each head from the SOC (not shown). The heating power register 157 and the digital codeword for controlling the heating power output to the head i may be C bits wide (e.g., C=7).

When the heating power register 157 receives the digital codeword for controlling the heating power output to the head i, the latch control module 158 generates control signals that select the latch 180-$i$ of the heating control module 164-$i$. The digital codeword for controlling the heating power output to the head i is transmitted to the latch 180-$i$ via the data bus comprising C bit lines and is latched in the latch 180-$i$ based on the control signals.

The control signals may include various signals. For example, the control signals may include head select signals. The head select signals may be different during SSW operation than during normal read/write operation. Occasionally, one or more latches 180-$i$ may be selected depending on the head select signals. Accordingly, the digital codeword in the heating power register 157 may be latched in one or more latches 180-$i$ at a time.

Additionally, the latches 180-$i$ may be bidirectional. In other words, the control module 152 may read digital codewords that are latched into the latches 180-$i$. Accordingly, the control signals may include signals that indicate whether a read or a write operation is being performed relative to the latches 180-$i$.

The heating control DAC 182-$i$ converts the digital codeword latched in the latch 180-$i$ and generates the heating power. The heating driver $D_{heat}$ of the channel 154-$i$ drives the heating element $R_i$ of the head i according to the heating power received from the heating control DAC 182-$i$. The width of the digital codeword (e.g., C bits) latched into the latches 180-$i$ determines the resolution with which the heating power output to each heating element can be controlled.

Although not shown, the width of the data bus may be further reduced by implementing the write current register 156 and the heating power register 157 using a single register called a parameter register. The parameter register may store the digital codeword for controlling the write current at a first time and the digital codeword for controlling the heating power at a second time. Depending on the content of the parameter register, the latch control module 158 may generate control signals that latch the content into one or more of the latches 170-$i$ or into one or more of the 180-$i$.

The teachings of the present disclosure may be extended to any multi-channel system, where each channel drives a load, and where operating parameters of each channel are digitally controlled using a single digital controller. For example, a multi-channel system may comprise an audio entertainment system having a plurality of speakers. A single digital controller may control various parameters of each channel that drives a speaker. For example, the parameters may include levels of bass, treble, and volume of each channel.

Figure 9A:
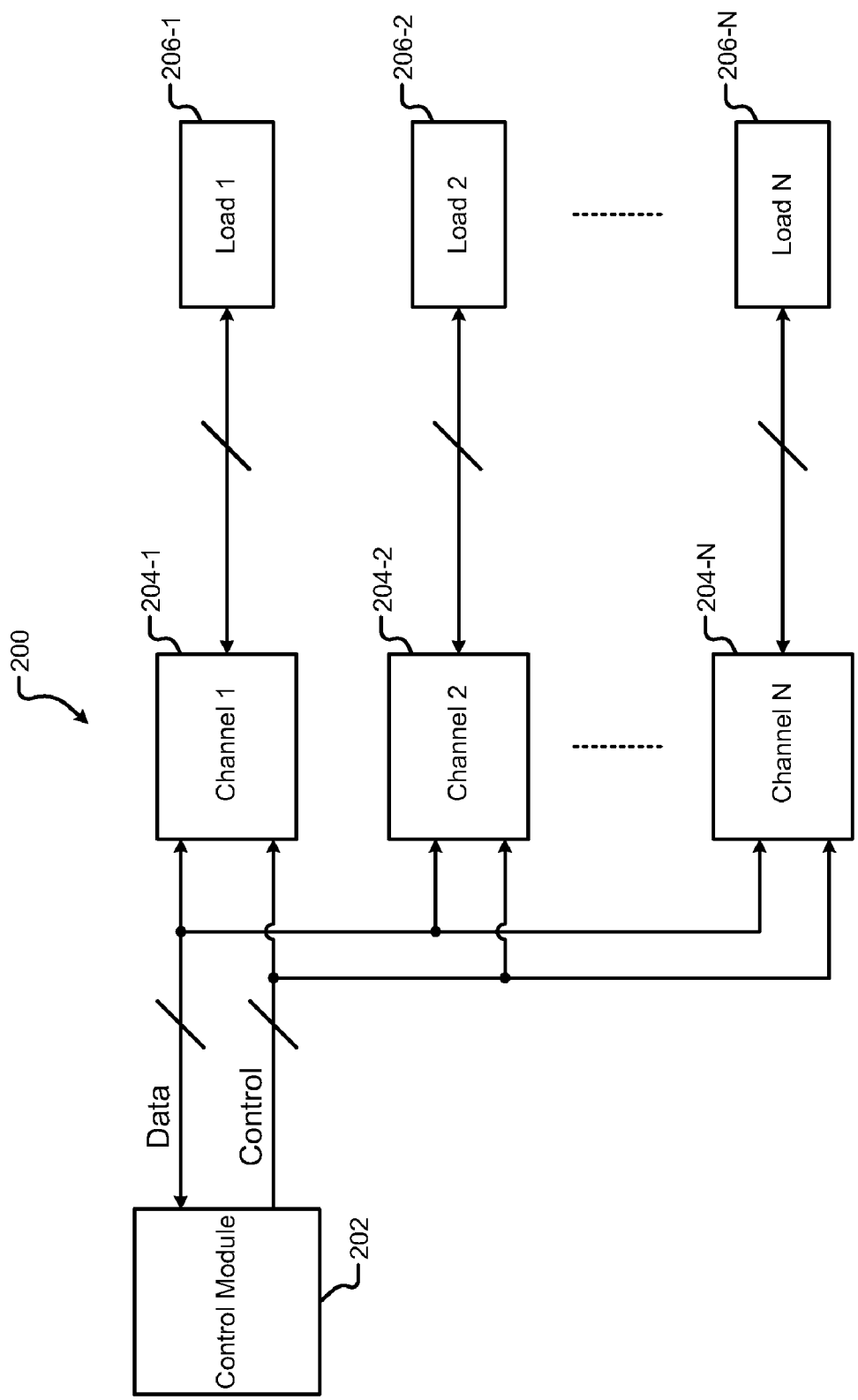
FIG. 9A is a functional block diagram of a digitally controlled multi-channel system.
Figure 9B:
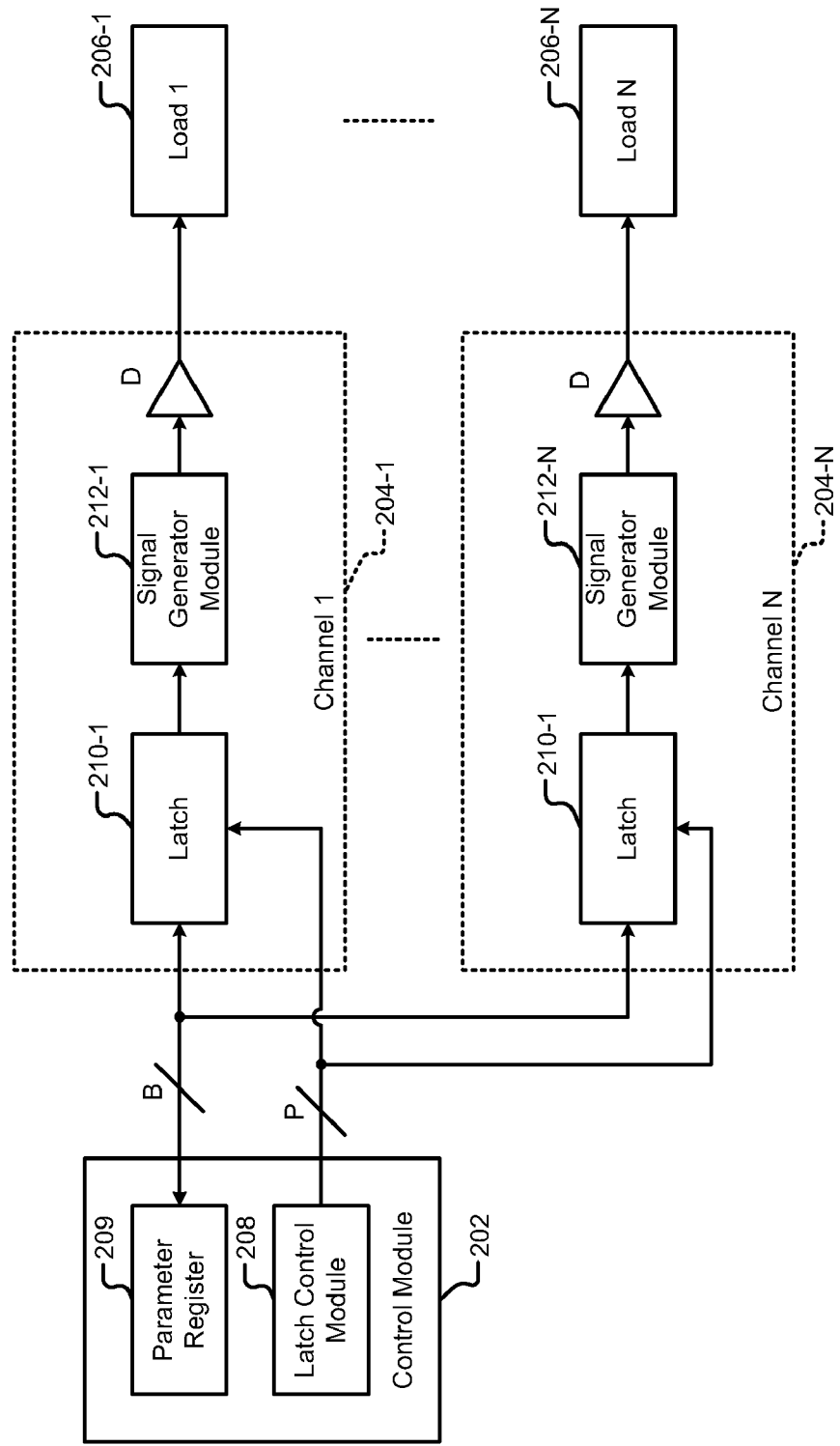
FIG. 9B is a functional block diagram of the multi-channel system of FIG. 9A showing details of the channels.

Referring now to FIGS. 9A and 9B, a digitally controlled multi-channel system 200 is shown. In FIG. 9A, the system 200 comprises a control module 202, N channels that communicate with N loads, respectively, where N is an integer greater than 1. The N channels include channels 204-1, 204-2, . . . , and 204-N (collectively channels 204). The N loads include Load 1 206-1, Load 2 206-2, . . . , and Load N 206-N (collectively loads 206). The control module 202 may communicate with a processor or a host (not shown). A single multiplexed data bus connects the control module 202 to the channels 204. The control module 202 generates control signals that select one or more channels 204 when the control module 202 transmits data to the one or more channels 204.

In FIG. 9B, the control module 202 comprises a latch control module 208 and a parameter register 209. A channel 204-*i* comprises a latch 210-*i*, a signal generator module 212-*i*, and a load driver D, where i is an integer, and $1 \leq i \leq N$. The parameter register 209 may receive a digital codeword comprising values for controlling operating parameters of one or more of the loads 206. The parameter register 209 may receive the digital codeword from the processor or the host. Alternatively, the control module 202 may generate the digital codeword. The bus width of the data bus is equal to the number of bits in the digital codeword (i.e., the width of the parameter register 209).

When the parameter register 209 receives the digital codeword for controlling the operating parameters of the Load i, the latch control module 208 generates control signals that select the latch 210-*i* of the channel 204-*i*. The digital codeword for controlling the operating parameters of the Load i is transmitted to the latch 210-*i* via the data bus and is latched in the latch 210-*i* based on the control signals. The latch control module 208 may generate control signals that select one or more of the latches 210 at a time. The signal generator module 212-*i* generates a signal for driving the Load i according to the digital codeword received from the control module 202. The driver D drives the Load i using the signal generated by the signal generator module 212-*i*.

Each of the loads 206 may be off different type and may have different operating parameters. For example, when the system 200 includes an audiovisual system, the Load 1 206-1 may include an audio load while the Load 2 206-2 may include a video load. Accordingly, the parameter register may store and output digital codewords that control different operating parameters of the different loads 206.

Those skilled in the art can now appreciate from the foregoing description that the broad teachings of the disclosure can be implemented in a variety of forms. Therefore, while this disclosure includes particular examples, the true scope of the disclosure should not be so limited since other modifications will become apparent upon a study of the drawings, the specification, and the following claims.

What is claimed is:

1. A system comprising:
    N channels, where N is an integer greater than 1, each comprising:
        a latch that selectively latches a B-bit codeword, where B is an integer greater than 1; and
        a signal generator module that generates a signal based on said B bit codeword; and
    a control module that transmits said B-bit codeword via a B-bit data bus to said latch of each of said N channels and that generates control signals that select said latch in at least one of said N channels.

2. The system of claim 1 wherein each of said N channels further comprises a driver that drives a load according to said signal.

3. The system of claim 2 wherein said B-bit codeword includes parameters for controlling said signal, and wherein said parameters are generated based on said load.

4. A preamplifier of a hard disk drive (HOD) comprising the system of claim 1, wherein each of said N channels further comprises a driver that drives a write element of a read/write head of said HDD according to said signal.

5. The preamplifier of claim 4 wherein said signal includes write current through said write element, and wherein said B-bit codeword determines at least one parameter of said write current.

6. The preamplifier of claim 5 wherein said at least one parameter is selected from a group consisting of overshoot amplitude, overshoot duration, and direct current (DC) value of said write current.

7. The preamplifier of claim 4 wherein said signal includes servo write current through said write element during a self-servo-write (SSW) operation of said HDD.

8. A preamplifier of a hard disk drive (HDD) comprising the system of claim 1, wherein each of said N channels further comprises a driver that drives a heating element of a read/write head of said HDD according to said signal.

9. The preamplifier of claim 8 wherein said B-bit codeword determines an amount of heating power output by said signal output to said heating element.

10. The preamplifier of claim 9 wherein said B-bit codeword determines said amount based on write current through a write element of said read/write head.

11. The preamplifier of claim 8 wherein said B-bit codeword is based on properties of at least one of said heating element and a write element of said read/write head.

12. A method comprising:
    transmitting a B-bit codeword via a B-bit data bus to N channels, where B and N are integers greater than 1;
    generating control signals that select a latch in at least one of said N channels;
    latching said B-bit codeword in said latch; and
    generating a signal based on said B bit codeword latched in said latch.

13. The method of claim 12 further comprising:
    driving a load of said at least one of said N channels according to said signal;
    transmitting parameters for controlling said signal via said B-bit codeword; and
    generating said parameters based on said load.

14. The method of claim 12 further comprising:
    communicating with N read/write heads of a hard disk drive (HDD) via said N channels, respectively; and
    driving a write element of said N read/write heads that correspond to said at least one of said N channels according to said signal.

15. The method of claim 14 further comprising:
    outputting write current through said write element using said signal;
    determining at least one parameter of said write current using said B-bit codeword; and
    selecting said at least one parameter from a group consisting of overshoot amplitude, overshoot duration, and direct current (DC) value of said write current.

16. The method of claim 14 further comprising driving said write element during a self-servo-write (SSW) operation.

17. The method of claim 12 further comprising:
    communicating with N read/write heads of a hard disk drive (HDD) via said N channels, respectively; and
    driving a heating element of said N read/write heads that correspond to said at least one of said N channels according to said signal.

18. The method of claim 17 further comprising:
    outputting heating power to said heating element using said signal; and
    determining an amount of said heating power using said B-bit codeword.

19. The method of claim 18 further comprising determining said amount based on write current through a write element of said N read/write heads that correspond to said at least one of said N channels.

20. The method of claim 17 further comprising generating said B-bit codeword based on properties of at least one of said heating element and a write element of said N read/write heads that correspond to said at least one of said N channels.

* * * * *